(12) United States Patent
Borio et al.

(10) Patent No.: US 9,637,311 B2
(45) Date of Patent: May 2, 2017

(54) ACRYLIC-FREE CONVEYOR BELT

(71) Applicant: Habasit Italiana S.p.A., Cesano Boscone (IT)

(72) Inventors: Paola Borio, Cavagnolo (IT); Elio Bibbò, Novara (IT)

(73) Assignee: Habasit Italiana S.p.A., Cesano Boscone (IT)

( * ) Notice: Subject to any disclaimer, the term of this patent is extended or adjusted under 35 U.S.C. 154(b) by 0 days.

(21) Appl. No.: 14/409,036

(22) PCT Filed: Jun. 18, 2013

(86) PCT No.: PCT/EP2013/062634
§ 371 (c)(1),
(2) Date: Dec. 18, 2014

(87) PCT Pub. No.: WO2013/189933
PCT Pub. Date: Dec. 27, 2013

(65) Prior Publication Data
US 2015/0225175 A1 Aug. 13, 2015

(30) Foreign Application Priority Data
Jun. 19, 2012 (EP) .................................... 12172572

(51) Int. Cl.
*B65G 23/04* (2006.01)
*B65G 15/34* (2006.01)
(Continued)

(52) U.S. Cl.
CPC ............. *B65G 15/34* (2013.01); *B29D 29/06* (2013.01); *B32B 5/024* (2013.01); *B32B 27/12* (2013.01);
(Continued)

(58) Field of Classification Search
None
See application file for complete search history.

(56) References Cited

U.S. PATENT DOCUMENTS 3,700,400 A * 10/1972 Cuthbertson ........... D06P 1/613
516/124
4,154,335 A * 5/1979 Burnett .................. B29D 29/00
156/148
(Continued)

FOREIGN PATENT DOCUMENTS

EP          0649871 A2    4/1995
GB          1013081 A    12/1965
(Continued)

*Primary Examiner* — William R Harp
(74) *Attorney, Agent, or Firm* — Hodgson Russ LLP

(57) ABSTRACT

A conveyor belt includes a bottom fabric layer having a lower first surface forming a backside of the conveyor belt and an upper first surface, wherein the lower first surface is impregnated with an impregnation having: a) one or more thermoplastic polyolefins selected from the group consisting of ethene homopolymers, propene homopolymers, ethene/α-olefin copolymers, propene/α-olefin copolymers and terpolymers of ethene with two or more different α-olefins; and b) a thermoplastic polymeric dispersing agent containing repetitive units derived from at least one ethylenically unsaturated monomer of a comparatively lipophilic nature and from at least one ethylenically unsaturated monomer of a comparatively hydrophilic nature and earring an anionic carboxylate group. A process for the manufacture of such belts includes applying the thermoplastic polyolefin(s) and the thermoplastic polymeric dispersing agent as an aqueous dispersion and heating the lower first surface having the dispersion applied thereonto.

12 Claims, 1 Drawing Sheet

(51) Int. Cl.
*B32B 5/02* (2006.01)
*B29D 29/06* (2006.01)
*B32B 27/12* (2006.01)
*B32B 27/32* (2006.01)
*D06N 3/04* (2006.01)
*C08L 23/08* (2006.01)
*C08L 83/04* (2006.01)
*C08L 83/12* (2006.01)
*C09D 123/08* (2006.01)
*B65G 15/28* (2006.01)
*C08G 77/46* (2006.01)
*B29K 23/00* (2006.01)
*B29K 105/00* (2006.01)

(52) U.S. Cl.
CPC ............ *B32B 27/32* (2013.01); *B65G 15/28* (2013.01); *C08L 23/08* (2013.01); *C08L 23/0869* (2013.01); *C08L 83/04* (2013.01); *C08L 83/12* (2013.01); *C09D 123/08* (2013.01); *D06N 3/045* (2013.01); *B29K 2023/00* (2013.01); *B29K 2105/0005* (2013.01); *B29K 2105/0085* (2013.01); *B32B 2255/02* (2013.01); *B32B 2255/26* (2013.01); *B32B 2255/28* (2013.01); *B32B 2307/554* (2013.01); *B32B 2307/5825* (2013.01); *B32B 2307/7246* (2013.01); *B32B 2433/02* (2013.01); *C08G 77/46* (2013.01); *C08L 2201/54* (2013.01); *C08L 2205/02* (2013.01); *D06N 2205/023* (2013.01); *D06N 2209/103* (2013.01); *D06N 2209/105* (2013.01); *D06N 2209/125* (2013.01); *D06N 2209/1685* (2013.01); *D06N 2211/04* (2013.01)

(56) References Cited

U.S. PATENT DOCUMENTS

| | | | | |
|---|---|---|---|---|
| 4,504,410 A * | 3/1985 | Hempel | ............. | B01D 19/0409 516/124 |
| 4,674,622 A * | 6/1987 | Utsunomiya | ............ | B32B 25/10 198/500 |
| 5,061,740 A * | 10/1991 | Inomata | .................... | C08K 9/06 523/212 |
| 5,161,677 A | 11/1992 | Beecher | | |
| 6,521,587 B1 * | 2/2003 | L'Hostis | ................ | B01D 19/0404 510/347 |
| 6,994,209 B2 * | 2/2006 | Cediel | .................... | B65G 15/32 198/847 |
| 7,267,219 B2 * | 9/2007 | Vogt | .......................... | F16G 3/10 198/844.1 |
| 8,261,906 B2 * | 9/2012 | Nakano | .................. | B29D 29/06 198/846 |
| 8,399,555 B2 * | 3/2013 | Kimura | .................. | C09D 5/028 427/388.4 |
| 8,609,774 B2 * | 12/2013 | Terada | .................... | B65G 15/32 198/844.1 |
| 8,946,329 B2 * | 2/2015 | Wilbur | ................. | C09D 7/1241 428/339 |
| 9,000,074 B2 * | 4/2015 | Choudhery | ................ | C08J 3/05 524/41 |
| 2005/0100754 A1 | 5/2005 | Moncla et al. | | |
| 2006/0163042 A1 | 7/2006 | Vogt | | |
| 2010/0300849 A1 * | 12/2010 | Spence | ................. | D21F 1/0027 198/846 |
| 2012/0053020 A1 * | 3/2012 | Wright | .................. | B65G 15/34 482/54 |
| 2012/0168285 A1 * | 7/2012 | Holland | ................. | B65G 15/34 198/847 |
| 2015/0368450 A1 * | 12/2015 | Sato | ........................ | C08L 23/16 198/846 |

FOREIGN PATENT DOCUMENTS

| | | |
|---|---|---|
| JP | 05-105791 A | 4/1993 |
| JP | 11-059844 A | 3/1999 |
| JP | 11-063116 A | 3/1999 |
| WO | 02/053477 A1 | 7/2002 |

* cited by examiner

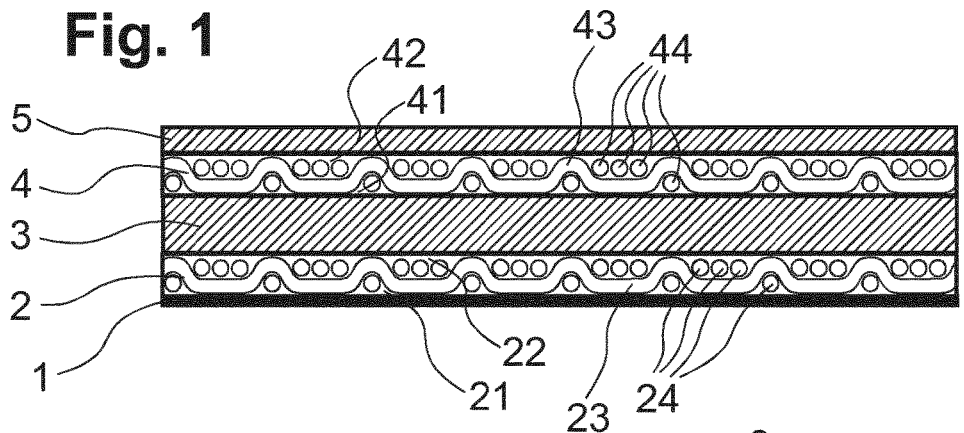
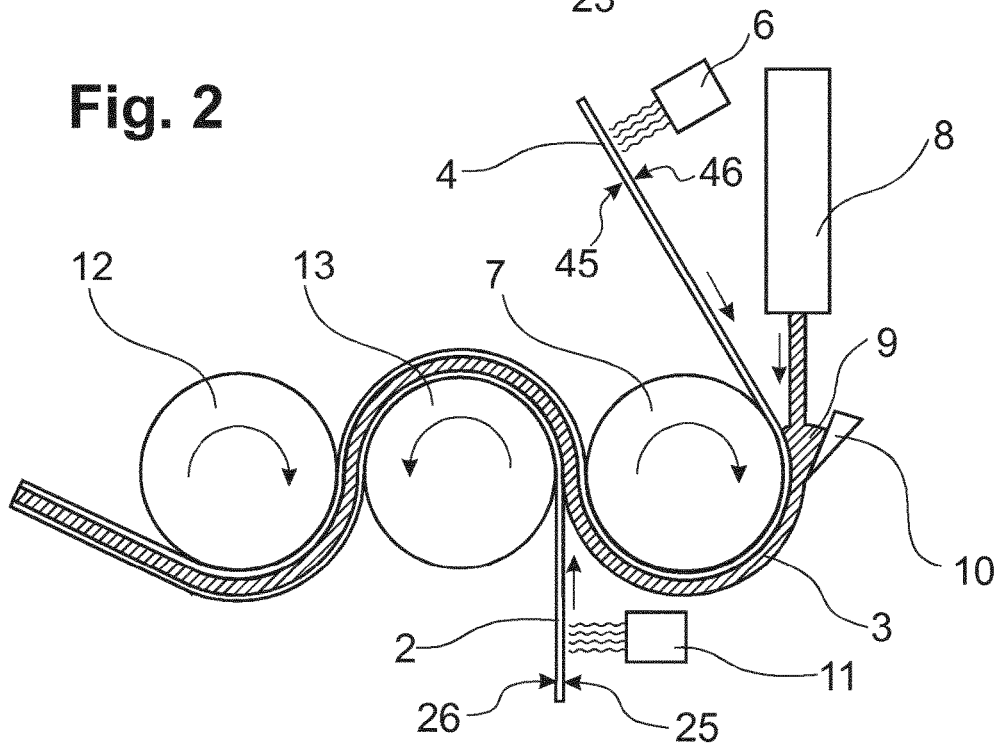
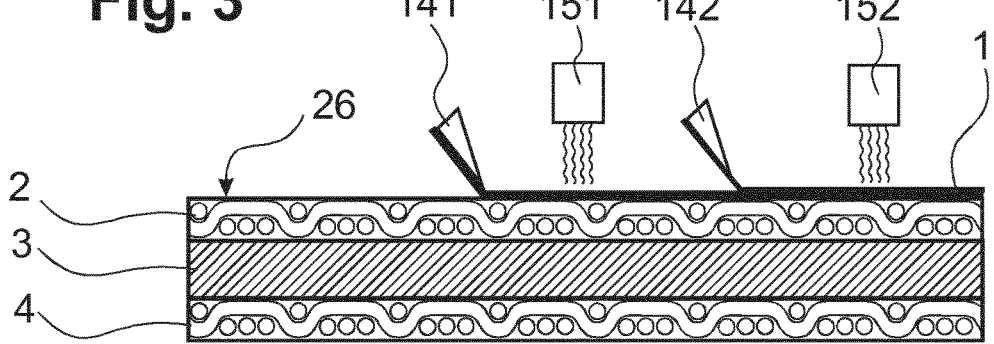

ACRYLIC-FREE CONVEYOR BELT

FIELD OF THE INVENTION

The present invention relates to conveyor belts used in the tobacco and food industries.

BACKGROUND

In the tobacco and food processing industries the tobacco or food products are customarily conveyed on conveyor belts from one processing step to the next and then to their eventual packaging. These belts have at least one bottom traction layer, which normally is a fabric, and which forms the backside layer these belts, i.e. their side opposite to the conveying side and running over the pulleys. In order to avoid penetration of moisture into these conveyor belts, which would favor the formation of mould, the bottom fabric is customarily sealed from the environment by applying an impregnation of a crosslinked acrylate polymer to it. Since the impregnation is then the material coming in contact with the pulleys, it is prone to form abraded acrylate-containing dust particles which may contaminate the tobacco or food products conveyed on the belt. In view of the ever more stringent consumer product safety regulations such acrylate contamination of the conveyed tobacco and food products becomes a growing concern.

In British patent specification No. 1,013,081 a conveyor belt for food applications comprising a carcass formed of a number of woven cotton fabrics bonded together by rubber or other elastomeric material is disclosed. The conveying surface, or both surfaces, of the belt were covered by a layer of pure polypropylene. The polypropylene was applied as a polypropylene sheet with a geometric thickness of 0.005 inch (=0.127 mm), by bonding by fusion and pressure to the fabric(s). The fabric(s) had been pretreated by exposure to an atmosphere of 63% to 67% relative humidity for 24 hours. The propylene covering layer(s) are said to have good adhesion to the fabric(s). The polypropylene coating also appears to withstand tensile forces and yet to have adequate flexibility.

Aqueous polyolefin dispersions have been known from e.g. JP 05/105791 A and US 2005/100754 A. These dispersions have been made by melt-kneading the polyolefin in an extruder together with a dispersing agent and water. The dispersing agent may be a monomeric surfactant or a polymer having ionizable groups, in particular anionically ionizable groups such as carboxylic acid groups. These dispersions have been used so far for coating paper or cardboard or for impregnating the backside of carpets, or have been converted to open-cell frothed foams.

Abovementioned US 2005/100754 A indicates that "some" of its dispersions are "particularly suited for the formation of textile coatings including fabric impregnation" but does not indicate which ones, out of its great range of possible dispersions, should be particularly suited for such purpose.

The present invention seeks an improved conveyor belt suitable for tobacco and food applications.

SUMMARY OF THE INVENTION

The invention thus provides:

1. A conveyor belt comprising a bottom fabric layer having a lower first surface forming a backside of said conveyor belt and an upper first surface, characterised in that said lower first surface is impregnated with an impregnation comprising:

a) one or more thermoplastic polyolefins selected from the group consisting of ethene homopolymers, propene homopolymers, ethene/α-olefin copolymers, propene/α-olefin copolymers and terpolymers of ethene with two or more different α-olefins; and b) a thermoplastic polymeric dispersing agent containing repetitive units derived from at least one ethylenically unsaturated monomer of a comparatively lipophilic nature and from at least one ethylenically unsaturated monomer of a comparatively hydrophilic nature and carrying an anionic carboxylate group.

2. The conveyor belt of above 1, wherein the thermoplastic polyolefin is an ethene/α-olefin copolymer, being present as the sole polyolefin.

3. The conveyor belt of above 2, wherein the copolymer comprises 5 to 25% by weight, more preferably 8 to 20% by weight, based on the copolymer, of ethene-derived units, and the remainder as α-olefin-derived units.

4. The conveyor belt of above 2 or 3, wherein the α-olefin is propene.

5. The conveyor belt of one of above 1 to 4, wherein in the impregnation the weight ratio between the total amount of the one or more thermoplastic polyolefins and the amount of thermoplastic polymeric dispersing agent is in the range of 6:1 to 2:1.

6. The conveyor belt of one of above 1 to 5, wherein the impregnation furthermore comprises a defoaming agent selected from the group consisting of:

d1) A Polysiloxane of the Formula Ia:

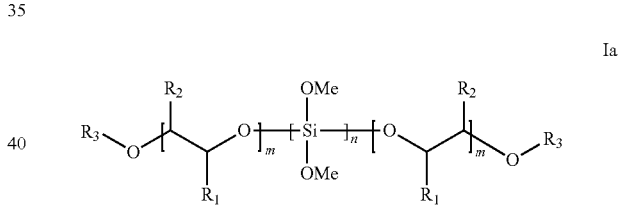

in which formula Ia $R_1$ and $R_2$ are hydrogen or methyl, with the proviso that at least one of $R_1$ and $R_2$ is hydrogen; $R_3$ is a linear $(C_1\text{-}C_6)$alkyl group, preferably a butyl group; and n and m are integer numbers chosen such as to obtain for the polysiloxane a kinematic viscosity of $10^{-4}$ to $3 \cdot 10^{-2}$ m$^2$s$^{-1}$ at room temperature;

d2) An Organopolysiloxane of the Formula Ib:

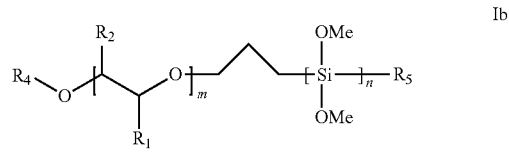

in which formula Ib $R_1$ and $R_2$ have the same meaning as for formula Ia; $R_4$ is hydrogen or a linear $(C_1\text{-}C_6)$alkyl group, preferably hydrogen; $R_5$ is a linear $(C_1\text{-}C_6)$alkyl group, preferably methyl or ethyl; and n and m are integer numbers, chosen such as to obtain for the organopolysiloxane a kinematic viscosity of $10^{-4}$ to $3 \cdot 10^{-2}$ m$^2$s$^{-1}$ at room temperature; and d3) A Poly(Dimethylsiloxane) in Combination with Silica.

7. The conveyor belt of above 6, wherein in the impregnation the defoaming agent is present in one part per weight per 800 to 1200 parts by weight of the total amount of the one or more thermoplastic polyolefins and the thermoplastic polymeric dispersing agent.

8. The conveyor belt of one of above 1 to 7, wherein the thickness h of the impregnation is in the range of 0.01 to 0.1 mm, wherein h is calculated according to the formula:

$$h = \frac{G_{polyolefin}}{\rho_{polyolefin}}$$

in which formula $G_{polyolefin}$ denotes the weight per unit area, in g/mm², of the impregnation and $\rho_{impregnation}$ denotes the density, in g/mm³, of the impregnation.

9. The conveyor belt of one of above 1 to 8, comprising a top fabric layer, having a lower second surface and an upper second surface, and an intermediate layer of a thermoplastic polymer being sandwiched between the upper first surface and the lower second surface.

10. A process for manufacturing the belt of above 1, comprising the steps of
   i) providing a belt carcass comprising a lower fabric, having a lower first surface and an upper first surface;
   ii) applying to said lower first surface an aqueous dispersion comprising:
   a) one or more thermoplastic polyolefins selected from the group consisting of ethene homopolymers, propene homopolymers; ethene/α-olefin copolymers and terpolymers of ethene with two or more different α-olefins; and
   b) a thermoplastic polymeric dispersing agent containing repetitive units derived from at least one ethylenically unsaturated monomer of a comparatively lipophilic nature and from at least one ethylenically unsaturated monomer of a comparatively hydrophilic nature and carrying a anionic carboxylate group; and
   c) water;
   iii) heating the lower first surface having said aqueous dispersion applied thereonto to cause the water to evaporate and to melt and fuse together said one or more thermoplastic polyolefins and the thermoplastic dispersing agent.

11. A conveyor apparatus comprising an endless conveyor belt and two or more pulleys over which the endless conveyor belt runs, characterised in that the endless conveyor belt is a belt according to one of above 1 to 9 and in that the impregnation is in contact with the pulleys.

12. The conveyor apparatus of above 11, wherein one of the pulleys also drives the belt.

DETAILED DESCRIPTION OF THE INVENTION

The essential components in the aqueous dispersion used to prepare the impregnation of the lower first surface of the inventive belt, which impregnation will in the following also be designated as the "backside impregnation", are as follows:
a) One or more, preferably one sole, non-crosslinked thermoplastic polyolefin(s). Examples for the polyolefin(s) are ethene homopolymers; propene homopolymers; ethene/α-olefin copolymers such as ethene/propene, ethene/1-butene, ethene/1-pentene, ethene/1-hexene and ethene/1-octene copolymers. Other examples are terpolymers of ethene with two different α-olefins such as ethene/propene/1-butene, ethene/propene/1-hexene, ethene/propene/1-octene or ethene/1-butene/1-hexene terpolymers; and propene/α-olefin copolymers wherein the α-olefin is other than propene such as propene/1-butene, propene/1-hexene, propene/4-methyl-1-pentene or propene/1-octene copolymers. The preferred polyolefin is a ethene/α-olefin copolymer, in particular an ethene/propene copolymer. Preferably these copolymers comprise 5 to 25% by eight, more preferably 8 to 20% by weight, based on the copolymer, of ethene-derived units, and the remainder as α-olefin-derived units. These copolymers are more preferably used as the sole polyolefin in the aqueous dispersion. The polyolefin(s) may have been polymerized using any suitable polymerization catalyst. Preferably they are however polymerized using metallocene catalysts, in particular the so-called "single-site" catalysts. Single-site catalysts have been customarily used in the field of polyolefins for about 15 years. A single-site catalyst consists of a mixture of a metallocene of a metal of group IVa of the transition elements [e.g. bis(cyclopentadienyl)dimethylzirconium, but also metallocenes with only one cyclopentadienyl ligand and optionally further ligands] and a co-catalyst. The function of the co-catalyst is to convert the metallocene catalyst during the polymerisation reaction to the single positive charged state. The co-catalyst forms therefore a non-nucelophilic counter anion which is not co-ordinated on the metallocene. An example of the co-catalyst is e.g. polymeric methyl aluminoxane [MAO, -(Me—Al—O)n-], that is used in such an amount that a molar ratio Al:metallocene of about 100:1 to about 10 000:1 results. A further example of the co-catalyst are boranes with electronegative substituents, such as, for example, polyfluorinated aromatic hydrocarbons. Examples for "single-site" catalysts are the monocyclopentadienyl metal catalysts which are described in U.S. Pat. No. 5,026,798, monocyclopentadienyl metal catalysts described in U.S. Pat. No. 5,132,380 and the "constrained geometry" catalysts described in EP 0 416 815, disclosed in that case with the co-catalysts.

The polyolefin, or, if several polyefins are used, each of these polyefins, preferably has a weight average molecular weight $(M_w)$ in the range of 15000 to 200000. $M_w$ is defined, as is customary in the art, as $$M_w = \frac{\sum_{k=1}^{K} n_k M_k}{\sum_{k=1}^{K} n_k}$$

wherein the index k in the sums runs over all possible polymer molecule types, each of these types having a single and defined molecular weight $M_k$, and $n_k$ is the number of polymer molecules having that specific molecular weight. $M_w$ can be determined e.g. by chromatographic separation of a sample of the polyolefin by gel permeation chromatography and simultaneous analysis of the fractions k so obtained by laser light scattering, typically using a He/Ne laser with wavelength of 632.8 nm. An example for a suited gel permeation chromatographic apparatus column is the Polymer Laboratories PL-GPC-220 high temperature chromatographic unit equipped with four linear mixed bed columns (Polymer Laboratories, 20-micron particle size). The oven temperature of the unit is typically kept at 120 to 170° C. depending on the polymer sample to be analysed. A typical mobile phase is 1,2,4-trichlorobenzene containing 200 ppm 2,6-di-t-butyl-4-methylphenol.

b) A polymeric, non-crosslinked thermoplastic dispersing agent containing repetitive units derived from at least one ethylenically unsaturated monomer of a comparatively lipophilic nature and from at least one ethylenically unsaturated monomer of a comparatively hydrophilic nature carrying an anionic carboxylate group. This dispersing agent is effective, also by virtue of the anionic carboxylate groups which reduce the interfacial tension between the immiscible phases polyolefin and aqueous phases, in dispersing the thermoplastic polyolefin in the aqueous dispersion. For the purpose of making the backside impregnation the polyolefin is preferably dispersed in a particle size of 5 μm or less. The comparatively lipophilic monomer preferably has a HLB value ("hydrophilic lipophilic balance" value) in the range of 1 to 10, more preferably of 1 to 8. Examples of the comparatively lipophilic monomer are ethene and α-olefins as exemplified above for the polyolefin, esters of α,β-unsaturated carboxylic acids such as ($C_1$-$C_{12}$)alkyl esters of (meth)acrylic acid, (e.g. methyl(meth)acrylate, ethyl(meth)acrylate, propyl(meth)acrylate, butyl(meth)acrylate). The comparatively hydrophilic monomer preferably has a HLB value in the range of 10 to 20, more preferably of 12 to 18. Examples for the monomer having a comparatively hydrophilic nature are carboxylic-acid group-containing ethylenically unsaturated monomers, in particular α,β-unsaturated carboxylic acids, such as acrylic acid, methacrylic acid, crotonic acid, fumaric acid and maleic acid; more preferably (meth)acrylic acid. This dispersing agent may be obtained by co-polymerizing or block-copolymerizing said at least one ethylenically unsaturated monomer of comparatively lipophilic nature, either under emulsion polymerization conditions with the least one ethylenically unsaturated monomer of a comparatively hydrophilic nature carrying an anionic group, or, alternatively, under homogeneous conditions with the least one ethylenically unsaturated monomer of a comparatively hydrophilic nature wherein the anionic carboxylate group is present as a neutral derivative thereof, such as an ester or amide group. In this latter case the neutral derivative of the anionic carboxylate group needs to be hydrolyzed at least partially into said anionic carboxylate group, using an alkali such as e.g. alkali metal hydroxide or 25% aqueous ammonia. The units having their neutral precursor groups hydrolyzed to anionic carboxylate groups are then the units having the comparatively hydrophilic nature. Conveniently the themoplastic polymeric dispersing agent is made by first polymerizing only ethylenically unsaturated monomers having a comparatively lipophilic nature as exemplified above, with the proviso that at least one of these monomers is an ester of α,β-unsaturated carboxylic acid as exemplified above, and then hydrolyzing at least a part of the ester groups to said anionic carboxylate groups using said alkali. The anionic carboxylate groups are then present as their alkali metal salt or ammonium salt.

c) Water. This is preferably a deionized water. Its amount is the balance to make 100% of the aqueous dispersion, after taking the desired amounts of above components a) and b) and, as desired, of below defoaming agent.

A further component preferably also present in the aqueous dispersion used to prepare the backside impregnation is a defoaming agent. Preferred examples for the defoaming agent are:

d1) A polysiloxane of the formula Ia:

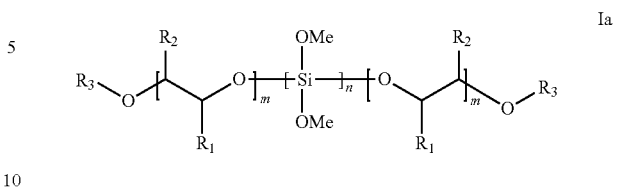

in which formula $R_1$ and $R_2$ are hydrogen or methyl, with the proviso that at least one of $R_1$ and $R_2$ is hydrogen; $R_3$ is a linear ($C_1$-$C_6$)alkyl group, preferably a butyl group; and n and m are integer numbers chosen such as to obtain for the polysiloxane a kinematic viscosity of $10^{-4}$ to $3·10^{-2}$ $m^2s^{-1}$ at room temperature, preferably of $3·10^{-4}$ to $10^{-3}$ $m^2s^{-1}$.

d2) An organopolysiloxane of the formula Ib:

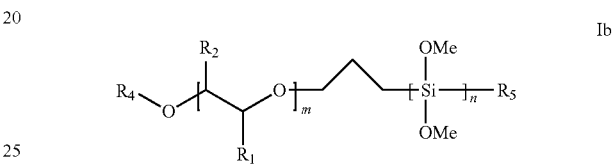

in which formula $R_1$ and $R_2$ have the same meaning as for formula Ia; $R_4$ is hydrogen or a linear ($C_1$-$C_6$)alkyl group, preferably hydrogen; $R_5$ is a linear ($C_1$-$C_6$)alkyl group, preferably methyl or ethyl; and n and m are integer numbers, chosen such as to obtain for the organopolysiloxane a kinematic viscosity of $10^{-4}$ to $3·10^{-2}$ $m^2s^{-1}$ at room temperature, preferably of $3·10^{-4}$ to $10^{-3}$ $m^2s^{-1}$.

d3) A poly(dimethylsiloxane) in combination with silica. The silica is preferably a precipitated silica. The weight ratio of poly(dimethylsiloxane) to silica is preferably in the range of 90:10 to 97:3. This type of defoaming agent is also known as "Simethicone". The molecular weight of the polydimethylsiloxane and the type and amount of silica combined therewith may again be chosen such that the overall defoaming agent d3) has a preferred kinematic viscosity of $10^{-4}$ to $3·10^{-2}$ $m^2s^{-1}$ at room temperature, preferably of $3·10^{-4}$ to $10^{-3}$ $m^2s^{-1}$.

The defoaming agent of above d1), d2) or d3) is preferably also non-crosslinked and thermoplastic. It is conveniently employed as an aqueous dispersion. In this case the dispersion preferably contains 15 to 20, more preferably 22 to 26% by weight based on the dispersion, of that defoaming agent. Also more preferably, that defoaming agent is dispersed in that dispersion using a neutral surfactant in an amount of typically 0.5 to 2.5% by weight, based on the dispersion. That neutral surfactant may e.g be a polyalkylene glycol, such as polyethylene glycol; a poly(oxyalkylene) ester of a fatty acid, such poly(oxyethylene) 40 monostearate; Polysorbate 60 to 65; a sugar alcohol partially esterified with a fatty acid, such as fatty acid mono- or diglycerides or sorbitan monostearate; or a $C_{10}$-$C_{20}$ fatty alcohol ether of a polyoxyalkylene, such as polyoxyethylene stearyl ether. The latter is preferred, and in an amount of 1 to 2.5% by weight, based on the defoaming agent dispersion. The defoaming agent is preferably employed in an amount of 0.01 to 1% by weight solids, more preferably of 0.01 to 0.5% by weight solids, based on the overall aqueous dispersion.

Each of the above components a) and b) preferably has a melting temperature of below 140° C., or, if it does not have a sharp melting point but a melting range, an upper boundary value of that melting range of below 140° C. The melting point of each of these components is preferably in the range of 60 to 100° C., if it has a sharp melting point. If it has a melting range then preferably that melting range does not extend over more than 20° C., and the melting range lies entirely within the range of 60 to 100° C. More preferably the melting range does not extend over more than about 10° C. and lies entirely within the range of 60 to 100° C. In order to fulfill such melting point requirements the weight average molecular weight ($M_w$) of the polyolefin, as discussed above, may be chosen appropriately, besides the monomer composition contained therein.

The belt of the invention and its backside impregnation according to the invention is stated to be "Acrylic-Free". This is on the one hand because the main components of the belt constituting its carcass, such as any fabrics and intermediate layers, are chosen to be acrylic-free. This is on the other hand because the main component of the backside impregnation is the polyolefin, which as per the above definition does not contain any acrylate. The only possible source of acrylate is the polymeric thermoplastic dispersiong agent. Since the amount of this dispersing agent, relative to the total amount of the backside impregnation, and the amount of the backside impregnation with respect to the total belt is also very low, the total amount of bound and free acrylate in the belt of the invention is customarily less than 0.1% by weight, preferably less than 0.01% by weight, based on the total weight of the finished belt. This may be considered as a definition for the above term "Acrylic-Free". Such residual acrylate contents are acceptable for the intended use of the belt in tobacco industries.

The pH of the overall aqueous dispersion used to prepare the backside impregnation, after addition of all components, is preferably in the range of 7 to 12, more preferably in the range of 8 to 11, still more preferably in the range of 8.5 to 10.5. This may require pH adjustment using a customary base such as an alkali metal hydroxide or 25% aqueous ammonia. This helps in maintaining the anionic carboxylate groups as their alkali metal salt or ammonium salt in the dispersion.

The total content of solids in the overall aqueous dispersion is preferably in the range of 30 to 60% by weight, more preferably in the range of 40 to 60% by weight, still more preferably in the range of 50 to 60% by weight, based on the dispersion.

The overall aqueous dispersion preferably contains the one or more thermoplastic polyolefins and the thermoplastic polymeric dispersing agent in a weight ratio of 6:1 to 2:1, whereby the exact ratio may determined by the amount of dispersing agent required to disperse the total given amount of thermoplastic polyolefin(s) in the aqueous dispersion.

All of the above components a), b), d1), d2) and d3) are nonvolatile. The absolute and relative amounts of these components, as present in the aqueous dispersion used to make the backside impregnation, are thus identically also present in the finished backside impregnation itself. The sum of all of the above components a), b), d1), d2) and d3) preferably makes up 90% by weight, more preferably 95% by weight, of the finished backside impregnation. It is also assumed that any cations present as counter cations for the anionic carboxylate groups in the dispersing agent b) are essentially identically retained in the finished backside impregnation. Thus, in the backside impregnation the weight ratio of the total amount of the one or more thermoplastic polyolefins and the amount of thermoplastic polymeric dispersing agent may preferably be in the range of 6:1 to 2:1.

The defoaming agent, if used, may be present in the backside impregnation in one part per weight per 800 to 1200 parts by weight of the total amount of the one or more thermoplastic polyolefins and thermoplastic polymeric dispersing agent.

The overall aqueous dispersion preferably has a dynamic viscosity in the range of 300 to 1000 mPa·s, preferably of 400 to 600 mPa·s at room temperature.

The aqueous dispersion is preferably made by melt-kneading, e.g using an extruder, preferably a twin screw extruder, as was known in the prior art. The granulated or powdered polyolefin and the dispersing agent may be fed in granulated form into the extruder using a first inlet, and an initial amount of water, which is typically lower than the eventual water content of the finished overall dispersion, may be fed into the extruder using a second inlet. Once these polymers and the water are fully mixed in the extruder, more polymer(s) and in particular more water may be provided by further inlets provided at the extruder. The eventual dispersion exiting at high temperature will generally have a polymer content which is above the one that is typically present in the ready to use overall dispersion, so it may finally be diluted down with water to above indicated solids contents.

Other contemplated ways of making the aqueous dispersion are by high-shear mixing or by sonicating with ultrasound the polymers (in preferably powdery form) and water at a temperature which is sufficiently high to at least partially melt the polymers.

The conveyor belt carcass onto which the backside polyolefin-containing impregnation is applied according to the invention is mostly conventional. Some generally preferred features 1) to 10) are as follows:

1) The bottom fabric, which is mandatorily present, is a m/n twill weave fabric, wherein m is an integer number from 2 to 5 and n is an integer number from 1 to 4, with the proviso that m is greater than n. This bottom fabric is arranged in the belt carcass such that its warp-predominant side forms the backside of the belt carcass, which backside is impregnated according to the invention.
2) The bottom fabric is a warp-faced twill weave, with m from 2 to 5 and n=1.
3) The warps of the bottom fabric are yarns of spun fibers.
4) The warps of the bottom fabric are of a polyester, preferably of polyethylene terephthalate (PET).
5) The wefts of the bottom fabric are monofilaments of a diameter in the range of 0.1 to 0.3 mm.
6) The wefts of the bottom fabric are of a polyester, preferably of polyethylene terephthalate (PET).
7) The setting of the bottom fabric is 2000 to 2500 warps per meter in the longitudinal (traction) direction and 1000 to 1400 wefts per meter in the transversal direction.
8) The thickness of the bottom fabric is in the range of 0.5 to 1 mm.
9) A second fabric is present as a top fabric. The two fabrics are separated from each other by an intermediate layer of a thermoplastic, preferably a hard thermoplastic polyolefin (TPO), in a thickness of 0.2 to 0.6 mm.
10) The top fabric has the same features as discussed under above 1) to 8) for the bottom fabric, and is arranged such in the belt carcass that its warp-predominant side faces towards the intermediate thermoplastic layer discussed under 9).

Even more preferably the conveyor belt carcass fulfills all of above 1) to 6), still more preferably all of above 1) to 8), most preferably all of above 1) to 10).

The thickness h of the finished backside polyolefin-containing impregnation applied to the backside of the belt carcass is preferably in the range of 0.01 to 0.1 mm, more preferably in the range of 0.05 to 0.09 mm, whereby such thickness h is calculated according to the formula:

$$h = \frac{G_{polyolefin}}{\rho_{polyolefin}} = \frac{G_{impregnated} - G_{bare}}{\rho_{polyolefin}}$$

in which formula:

$G_{polyolefin}$ denotes the weight per unit area, in g/mm², of polyolefin-containing backside impregnation;

$G_{impregnated}$ denotes the weight per unit area, in g/mm², of the belt having the backside impregnation applied;

$G_{bare}$ denotes the weight per unit area, in g/mm², of the belt carcass not yet impregnated with the polyolefin-containing backside impregnation; and $\rho_{impregnation}$ denotes the density, in g/mm³, of the polyolefin-containing backside impregnation.

This thickness may be calculated for polyolefin-containing impregnation(s) whether geometrically defined or not (i.e. having a directly measurable and defined thickness $h_0$ or not having such defined thickness). Any polyolefin-containing sheet of a given defined geometric thickness $h_0$ that was applied in the prior art (such as in British patent specification No. 1,013,081 cited above) to a fabric must have given for the finished polyolefin coating a thickness h calculated by the above formula which is equal to said $h_0$, assuming that no material was lost during the application to the bottom fabric.

The conveyor belt according to the invention may be made endless by any end joining method known in the art of conveyor belts, such as the finger end joint and the step joint.

The conveyor belt according to the invention is suitable for applications in conveyors customarily used in the tobacco and food industries. These conveyors typically comprise two or more pulleys around which the conveyor belt in an endless form loops. One of these pulleys acts as the driving pulley that drives the conveyor belt. The conveyor belt of the invention is employed such that the backside impregnation is in contact with the pulleys, including the driving pulley. It has emerged in tests that the backside belt impregnation according to the invention is firstly similarly moisture-repellent, moisture-tight and water-vapour tight as the prior art belts with acrylics-containing backside impregnation. This is unexpected insofar as the anionic carboxylate groups present in the thermoplastic polymeric dispersing agent, being of highly hydrophilic nature, would be expected to have a detrimental effect on the moisture-repellency, water-tightness and/or water vapour tightness of the backside impregnation of the invention. The backside impregnation of the invention provides the belt with improved water-repellency in comparison to the corresponding belt lacking such backside impregnation, but without changing the sliding properties of the belt. The belt comprising the backside impregnation of the invention is furthermore at least equally stable to abrasion as the prior art acrylics-containing backside belt impregnations. Still furthermore it is at least equally durable from the point of wear and tear and from the resistance to crack formation as the prior art acrylics-containing belt impregnation.

The invention is now further explained with reference to the drawings, in which

FIG. 1 is a sectional view of a preferred embodiment of the belt of the invention;

FIG. 2 is a schematic view of the manufacture of the belt carcass of the belt of FIG. 1; and FIG. 3 is a schematic view of the application procedure of the backside polyolefin containing impregnation.

FIG. 1 shows a preferred embodiment of a conveyor belt according to the invention. It consists of a bottom fabric 2 and an upper fabric 4, both typically designed as a 3/1 twill-weave fabric, made of PET spun fiber yarns as warp yarns and PET monofilaments as weft filaments. Every 12th warp yarn may be made antistatic by including into it a thread of carbon fiber (Belltorn B31). The warp-predominance of the lower part 21 of the bottom fabric 2 is seen in longitudinal sectional view through one of the warp yarns 23. This lower part 21 has a lower first surface which, due to said prevalence of the longitudinal warp yarns, is comparatively smoother in longitudinal direction. The weft prevalence of the upper part 22 of the bottom fabric 2 is seen as the cross sectional view of the transversal monofilaments 24. This upper part 22 has an upper first surface which, due to said prevalence of the monofilament wefts, is comparatively rougher in longitudinal direction. The bottom fabric 2 has a thickness of about 0.7 mm. The warp-predominance of the lower part 41 of the top fabric 4 is again seen in longitudinal sectional view through one of the warp yarns 43. This lower part 41 has a lower second surface which, due to said prevalence of the longitudinal warp yarns, is comparatively smoother in longitudinal direction. The weft prevalence of the upper part 42 of the top fabric 4 is seen as the cross sectional view of the transversal monofilaments 44. This upper part 42 has an upper second surface which, due to said prevalence of the monofilament wefts, is comparatively rougher in longitudinal direction. The top fabric has a thickness of about 0.7 mm. In between bottom fabric 2 and upper fabric 4 there is sandwiched an unfoamed layer 3 of a hard thermoplastic polyolefin (TPO) with a thickness of about 0.4 mm. Bottom fabric 2, sandwiched TPO layer 3 and top fabric 4 form the carcass of the conveyor belt. The lower first side of the bottom fabric 2, i.e. the backside of the conveyor belt carcass, has a lower first surface (not designated in this figure with a reference symbol, but FIG. 3 shows it with reference symbol 26) which is impregnated with the polyolefin-containing backside impregnation 1. Atop of the upper fabric 4 there is a further unfoamed cover layer 5 of a thickness of about 0.4 mm, again typically made of a hard TPO but which, depending on the intended surface characteristics of that cover layer 5, might also be made from other materials. In this embodiment the individual layers adhere to each other by mere mechanical adhesion, i.e. there are no adhesive layers used.

FIG. 2 shows schematically a production line for the carcass of the conveyor belt of FIG. 1 (the carcass is shown in FIG. 3 and is the layered composite formed from the two fabric layers 2 and 4 and the TPO layer 3 sandwiched in between). An upper fabric layer 4 as exemplified in the description of FIG. 1 is pre-heated on its lower second surface 46 using a heater 6 and is fed onto the surface of a roll 7. A molten hard TPO is extruded from an extruder 8 and is collected in a rolling bank 9 formed by the combination of the upper fabric layer 4 lying on the roll 7 and a heated doctor blade 10. A TPO film is applied from the rolling bank 9 onto the pre-heated lower second surface 46 of the upper fabric layer 4 to form a hard TPO layer 3. The thickness of the TPO layer 3 is controllable by the gap between the heated doctor blade 10 and the heated lower second surface 46 of the upper fabric layer 4. A bottom fabric layer 2 as exemplified in the description of FIG. 1 is pre-heated on its upper first surface 25 using a heater 11 and is applied over that upper first surface 25 to the other side of the hard TPO layer 3, to obtain the conveyor belt carcass with its backside (which is the lower first surface 26 of the bottom fabric 2) still being not impregnated. The obtained layered composite, consisting of the upper and lower fabrics 4,2 and the layer 3 of hard TPO sandwiched in between, may, as shown in the figure, optionally be embossed in-line on the upper second surface 45 using a combination of an embossing roll 12 and a rubber-coated backing roll 13.

FIG. 3 shows the application of the backside impregnation 1 to the belt carcass as obtainable by the process of FIG. 2. It is applied using an aqueous dispersion marketed by Dow Chemical under the trade name of HyPOD XU-36534. This dispersion contains about 55% by weight of total dispersed solids (ethene/propene copolymer and ethene/acrylic acid copolymer as thermoplastic polymeric dispersing agent in a weight ratio of about 2:1) and about 0.05% by weight, based on the dispersion, of a defoaming agent (TEGO FOAMEX 1488). It is applied by spread-coating using knifes over air or doctor blades 141, 142 to said backside of the belt carcass. The dispersion is applied in a first pass using the knife over air or doctor blade 141 in an amount of 70 g per square meter of backside surface and in a second pass using the knife over air or doctor blade 142 in an amount of 40 g per square meter. Between each of the passes the applied dispersion is heated up using drying units 151 or 152, respectively, to evaporate the dispersion water, typically by heating the wet dispersion coating to 20 to 165° C. for about 8-10 min, and to cause the polyolefin and dispersing agent particles to melt and fuse together to form the impregnation 1. Since the solids content of the dispersion is about 55% a total of about 0.0000605 g/mm² of solids are applied over the two passes ($=G_{polyolefin}$) Assuming a density of the finished impregnation ($\rho_{impregnation}$) of about 0.0009 g/mm³ this gives a thickness h of the finished backside impregnation 1 of about 0.067 mm according to the above shown formula.

As the last step, not shown by the FIGS. 2 and 3, a cover layer 5 may be calendered in a customary way onto the conveyor belt, again without using an adhesive layer. An exemplary process for the application of such a cover layer 5 may be analogous to the one shown in FIG. 2, with the exceptions that a) instead of the upper fabric 4 the layered composite consisting of the two fabric layers 2 and 4 and the TPO layer 3 sandwiched in between is fed onto the surface of the roll 7, b) the material of the cover layer 5 is extruded from the extruder 8, and c) no further fabric layer is bonded to the layered composite. The applied cover layer 5 may optionally again be embossed in-line on its top surface using a combination of an embossing roll and a rubber-coated backing roll.

EXAMPLE

Determination of Moisture-Repellency or Moisture-Tightness of Belts Having Conventional (Acrylics-Containing) Backside Impregnation and Inventive Backside Impregnation The test is based on the extent of absorption of drops of water coloured with blue ink through the backside impregnation into the bottom fabric layer of the belt. Any absorption of blue inked water from a drop by the belt manifests itself in that the drop, initially having a circular and regular outline, obtains an irregular outline, with streaks or halos of bluish colour absorbed into the bottom fabric layer of the belt and surrounding the drop. Rows of drops of blue inked water, of about 0.05 ml per drop, are applied onto the backside impregnation using a dropper, with the belt specimen lying horizontally flat and upside down. For belts having at the most 2300 mm of width nine drop rows are applied, all running in parallel to each other and in the transversal direction of the belt. Each drop row contains 20 drops being spaced apart from each other by 15 mm. The nine drop rows are sub-divided into three row groups; each row group contains three drop rows, a front (F) row, a middle (M) row and a rear (R) row, these rows being spaced apart from each other in the longitudinal direction of the belt by a distance of 200 mm. One row group is near the left edge of the belt, one row group is near the right edge of the belt, and one row group is at the center of the belt. This gives in total 20 drops per row×three rows per row group×three row groups (left row group, center row group, right row group) per belt specimen=180 drops. For belts having a width greater than 2300 mm the applied pattern of drops is analogous, except that there are fifteen drop rows arranged in five row groups instead of nine rows arranged in three row groups: One row group at the left edge of the belt, one row group at the right edge of the belt, one row group at the center of the belt, one intermediate row group between left row group and center row group, and another intermediate row group between right row group and center row group. This gives in total 20 drops per row×three rows per row group×five row groups (left row group, intermediate left row group, center row group, intermediate right row group, right row group) per belt specimen=300 drops.

The drops applied onto the backside impregnation are allowed to dry out at ambient conditions, during which, depending on the degree of moisture-repellency or moisture-tightness of the backside impregnation, some of the blue inked water may penetrate into the bottom fabric layer of the belt, causing said irregular outline, streaks and/or halos surrounding the drop(s). Drying out of the drops typically takes half a day at ambient conditions. After the drops have dried out the number of dried out spots still having a circular, regular outline without surrounding halos and/or streaks are counted, optionally using a magnifying glass. The higher the number of dried out spots having circular, regular outline without surrounding halos and/or streaks, the better the moisture-repellency or moisture-tightness of the backside impregnation.

The belt specimens to be tested are equilibrated beforehand with an atmospheric environment of 23° C.±2° C. and relative humidity of 50%±5%.

Five belt specimens, having a construction as described for and shown in FIG. 1, were tested using the above test procedure. One belt specimen had a conventional acrylics-containing backside impregnation ("control") and a width of >2300 mm, and four belt specimens had a backside impregnation according to the invention ("inventive #1-#4") and a width of at the most 2300 mm. In view of the widths of the belt specimens, five row groups were applied onto the control belt specimen and three row groups were applied onto the inventive belt specimens. The results, thus the counted numbers of dried out spots retaining the circular, regular outline, are shown in table 1 below. In this table, the row groups are designated as follows:

| left row group | A |
| intermediate left row group | AC |
| center row group | C |
| intermediate right row group | CN |
| right row group | N |

Within each row group the front, center and rear rows are designated with the abovementioned letter codes F, M and R. "avg" designates the arithmetic average from the numbers of dried out spots retaining the circular, regular outline of the F, M and R rows within each row group.

TABLE 1

| | Belt specimen | | | | | | | | | | | | | | | | | | | |
|---|---|---|---|---|---|---|---|---|---|---|---|---|---|---|---|---|---|---|---|---|
| | A | | | | AC | | | | C | | | | CN | | | | N | | | |
| | F | M | R | avg | F | M | R | avg | F | M | R | avg | F | M | R | avg | F | M | R | avg |
| Control | 20 | 20 | 20 | 20 | 20 | 20 | 20 | 20 | 20 | 20 | 20 | 20 | 20 | 20 | 20 | 20 | 20 | 20 | 20 | 20 |
| inventive #1 | 20 | 20 | 18 | 19 | | | | | 19 | 20 | 19 | 19 | | | | | 20 | 20 | 19 | 20 |
| inventive #2 | 18 | 20 | 20 | 19 | | | | | 20 | 18 | 19 | 19 | | | | | 20 | 19 | 17 | 19 |
| inventive #3 | 20 | 20 | 19 | 20 | | | | | 18 | 20 | 17 | 18 | | | | | 18 | 19 | 18 | 18 |
| inventive #4 | 19 | 20 | 18 | 19 | | | | | 17 | 19 | 17 | 18 | | | | | 17 | 17 | 18 | 17 |

The invention claimed is:

1. A conveyor belt comprising a bottom fabric layer (2) having a lower first surface (26) forming a backside of said conveyor belt and an upper first surface (25), wherein said lower first surface (26) is impregnated with an impregnation (1) comprising:
   a) one or more thermoplastic polyolefins selected from the group consisting of ethene homopolymers, propene homopolymers, ethene/α-olefin copolymers, propene/α-olefin copolymers and terpolymers of ethene with two or more different α-olefins; and
   b) a thermoplastic polymeric dispersing agent containing repetitive units derived from at least one ethylenically unsaturated monomer of a comparatively lipophilic nature and from at least one ethylenically unsaturated monomer of a comparatively hydrophilic nature and carrying an anionic carboxylate group.

2. The conveyor belt of claim 1, wherein the thermoplastic polyolefin is an ethene/α-olefin copolymer, being present as the sole polyolefin.

3. The conveyor belt of claim 2, wherein the copolymer comprises 5 to 25% by weight based on the copolymer, of ethene-derived units, and the remainder as α-olefin-derived units.

4. The conveyor belt of claim 2, wherein the α-olefin is propene.

5. The conveyor belt of claim 1, wherein in the impregnation (1) the weight ratio between the total amount of the one or more thermoplastic polyolefins and the amount of thermoplastic polymeric dispersing agent is in the range of 6:1 to 2:1.

6. The conveyor belt of claim 1, wherein the impregnation (1) furthermore comprises a defoaming agent selected from the group consisting of:
   d1) a polysiloxane of the formula Ia:

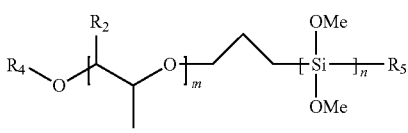

in which formula Ia $R_1$ and $R_2$ are hydrogen or methyl, with the proviso that at least one of $R_1$ and $R_2$ is hydrogen; $R_3$ is a linear ($C_1$-$C_6$) alkyl group; and n and m are integer numbers chosen such as to obtain for the polysiloxane a kinematic viscosity of $10^{-4}$ to $3 \cdot 10^{-2}$ $m^2 s^{-1}$ at room temperature;
   d2) an organopolysiloxane of the formula Ib:

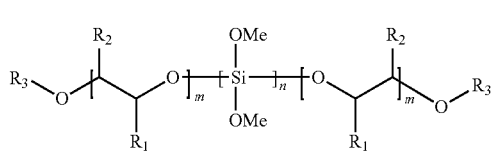

in which formula Ib $R_1$ and $R_2$ have the same meaning as for formula Ia; $R_4$ is hydrogen or a linear ($C_1$-$C_6$) alkyl group; $R_5$ is a linear ($C_1$-$C_6$) alkyl group; and n and m are integer numbers, chosen such as to obtain for the organopolysiloxane a kinematic viscosity of $10^{-4}$ to $3 \cdot 10^{-2}$ $m^2 s^{-1}$ at room temperature; and
   d3) a poly (dimethylsiloxane) in combination with silica.

7. The conveyor belt of claim 6, wherein in the impregnation (1) the defoaming agent is present in one part per weight per 800 to 1200 parts by weight of the total amount of the one or more thermoplastic polyolefins and the thermoplastic polymeric dispersing agent.

8. The conveyor belt of claim 1, wherein the thickness h of the impregnation (1) is in the range of 0.01 to 0.1 mm, wherein h is calculated according to the formula:

$$h = \frac{G_{impregnated} - G_{bare}}{\rho_{impregnation}}$$

in which formula $G_{impregnated}$ denotes the weight per unit area, in $g/mm^2$, of the belt having the impregnation (1) applied, $G_{bare}$ denotes the weight per unit area, in $g/mm^2$, of the belt carcass not yet impregnated with the impregnation (1), and $\rho_{impregnation}$ denotes the density, in $g/mm^3$, of the impregnation (1).

9. The conveyor belt of claim 1, comprising a top fabric layer (4), having a lower second surface (46) and an upper second surface (45), and an intermediate layer (3) of a thermoplastic polymer being sandwiched between the upper first surface (25) and the lower second surface (46).

10. A process for manufacturing the belt of claim 1, comprising the steps of:
   i) providing a belt carcass comprising a lower fabric (2), having a lower first surface (26) and an upper first surface (25),
   ii) applying to said lower first surface (26) an aqueous dispersion comprising:
   a) one or more thermoplastic polyolefins selected from the group consisting of ethene homopolymers, propene homopolymers; ethene/α-olefin copolymers and terpolymers of ethene with two or more different α-olefins; and b) a thermoplastic polymeric dispersing agent containing repetitive units derived from at least one ethylenically unsaturated monomer of a comparatively lipophilic nature and from at least one ethylenically unsaturated monomer of a comparatively hydrophilic nature and carrying a anionic carboxylate group; and c) water, iii) heating the lower first surface (26) having said aqueous dispersion applied thereonto to cause the water to evaporate and to melt and fuse together said one or more thermoplastic polyolefins and the thermoplastic dispersing agent.

11. A conveyor apparatus comprising an endless conveyor belt and two or more pulleys over which the endless conveyor belt runs, wherein the endless conveyor belt is a belt according to claim 1 and in that the impregnation (1) is in contact with the pulleys.

12. The conveyor apparatus of claim 11, wherein one of the pulleys also drives the belt.

\* \* \* \* \*